F. BALZER.
REVERSING MECHANISM FOR CYLINDER WASHING MACHINES.
APPLICATION FILED NOV. 8, 1913.

1,151,990.

Patented Aug. 31, 1915.
6 SHEETS—SHEET 1.

Witnesses:
Dunlap
Henry A. Parks

Inventor:
Fritz Balzer
By Sheridan, Wilkinson & Scott
Attys.

F. BALZER.
REVERSING MECHANISM FOR CYLINDER WASHING MACHINES.
APPLICATION FILED NOV. 8, 1913.
1,151,990.
Patented Aug. 31, 1915.
6 SHEETS—SHEET 2.
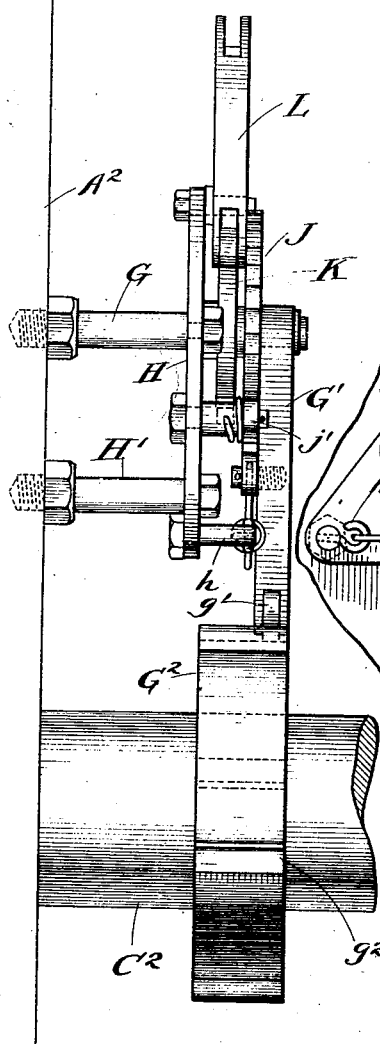
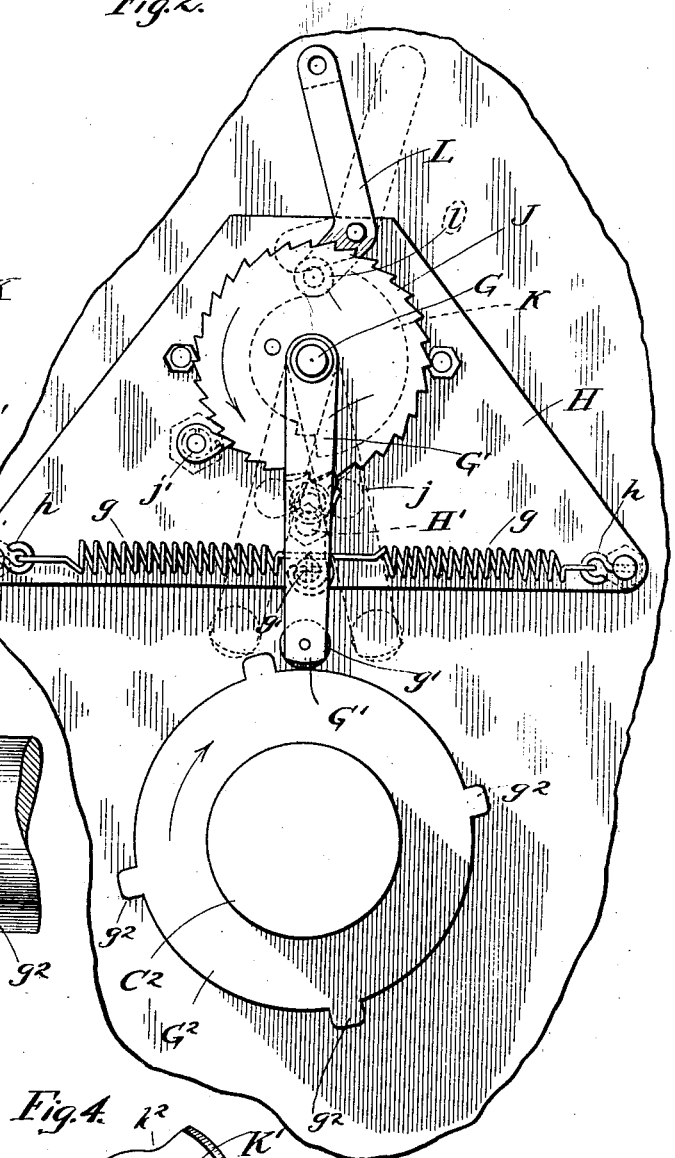
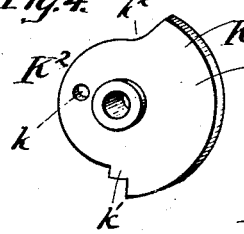
Witnesses:
Inventor
Fritz Balzer
By Sheridan, Wilkinson & Scott Att'ys.

F. BALZER.
REVERSING MECHANISM FOR CYLINDER WASHING MACHINES.
APPLICATION FILED NOV. 8, 1913.

1,151,990.

Patented Aug. 31, 1915.
6 SHEETS—SHEET 3.

Witnesses:
Henry A. Parks
Helen Freund

Inventor:
Fritz Balzer
By Sheridan, Wilkinson & Scott
Attys

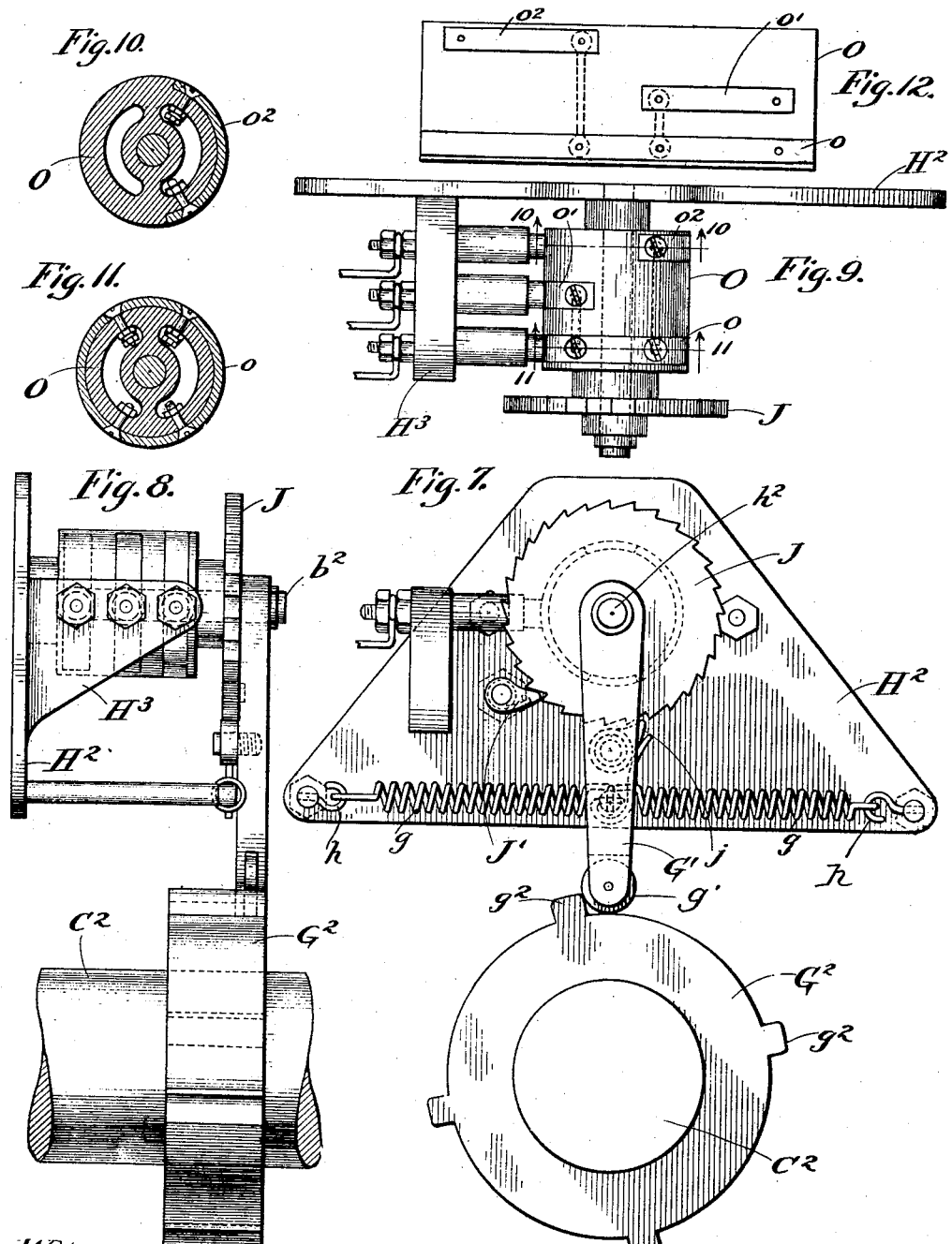

F. BALZER.
REVERSING MECHANISM FOR CYLINDER WASHING MACHINES.
APPLICATION FILED NOV. 8, 1913.

1,151,990.

Patented Aug. 31, 1915.
6 SHEETS—SHEET 5.

Witnesses:
Inventor:
Fritz Balzer
By Sheridan, Wilkinson & Scott
Att'ys

F. BALZER.
REVERSING MECHANISM FOR CYLINDER WASHING MACHINES.
APPLICATION FILED NOV. 8, 1913.

1,151,990.

Patented Aug. 31, 1915.
6 SHEETS—SHEET 6.

Witnesses:

Inventor:
Fritz Balzer
By Sheridan, Wilkinson & Scott Att'ys

UNITED STATES PATENT OFFICE.

FRITZ BALZER, OF CHICAGO, ILLINOIS, ASSIGNOR TO TROY LAUNDRY MACHINERY COMPANY, LIMITED, OF CHICAGO, ILLINOIS, A CORPORATION OF NEW YORK.

REVERSING MECHANISM FOR CYLINDER WASHING-MACHINES.

1,151,990.  Specification of Letters Patent.  Patented Aug. 31, 1915.

Application filed November 8, 1913. Serial No. 799,944.

*To all whom it may concern:*

Be it known that I, FRITZ BALZER, a subject of the Emperor of Germany, residing at Chicago, in the county of Cook and State of Illinois, have invented certain new and useful Improvements in Reversing Mechanism for Cylinder Washing-Machines, of which the following is a specification.

My invention relates in general to cylinder washing machines, and more particularly to mechanism for automatically reversing the direction of rotation of the cylinder at predetermined intervals.

In cylinder washing machines it is desirable to provide mechanism for periodically reversing the direction of rotation of the cylinder in order that the articles may be agitated and thoroughly exposed to the action of the suds.

The primary object of my invention is to provide an electrically driven cylinder washing machine with mechanism actuated by the rotation of the cylinder for periodically reversing the current through the electric motor, and thereby reversing the direction of rotation of the cylinder.

A further object of my invention is to provide an electrically driven cylinder washing machine with an automatic reversing mechanism which will be comparatively simple in construction, efficient in operation, and durable in use.

My invention will be more fully disclosed hereinafter with reference to the accompanying drawings, in which the same is illustrated as embodied in two convenient and practical forms, and in which—

Figure 1:
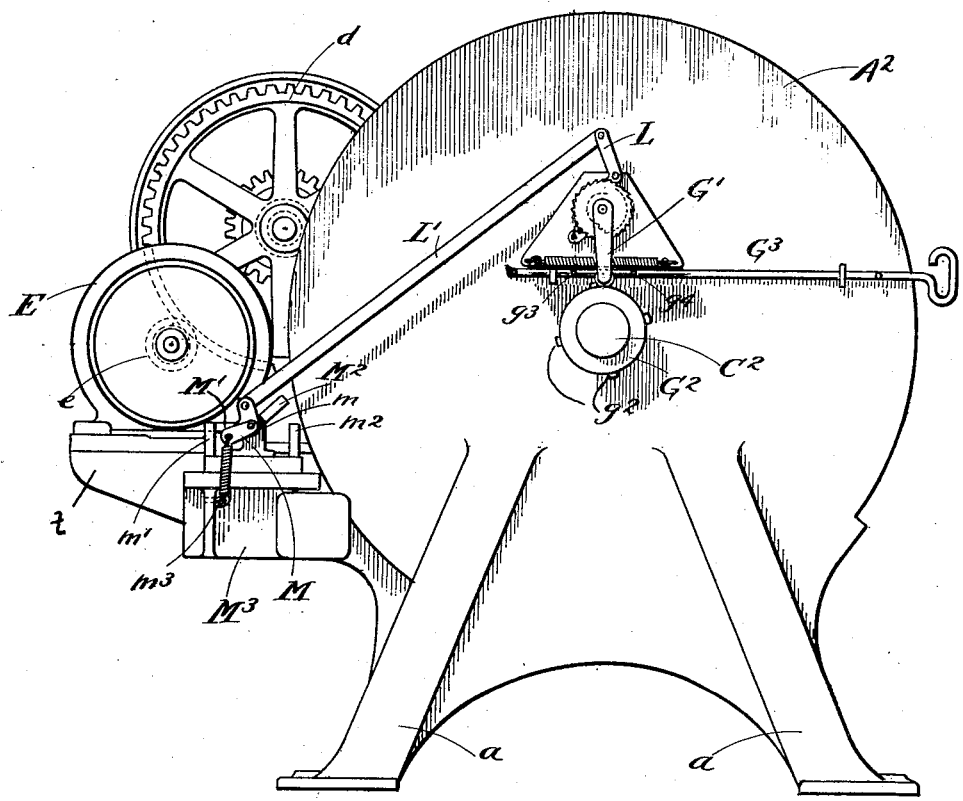
Figure 5:
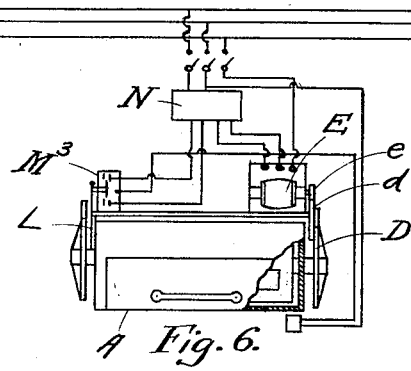
Figure 6:
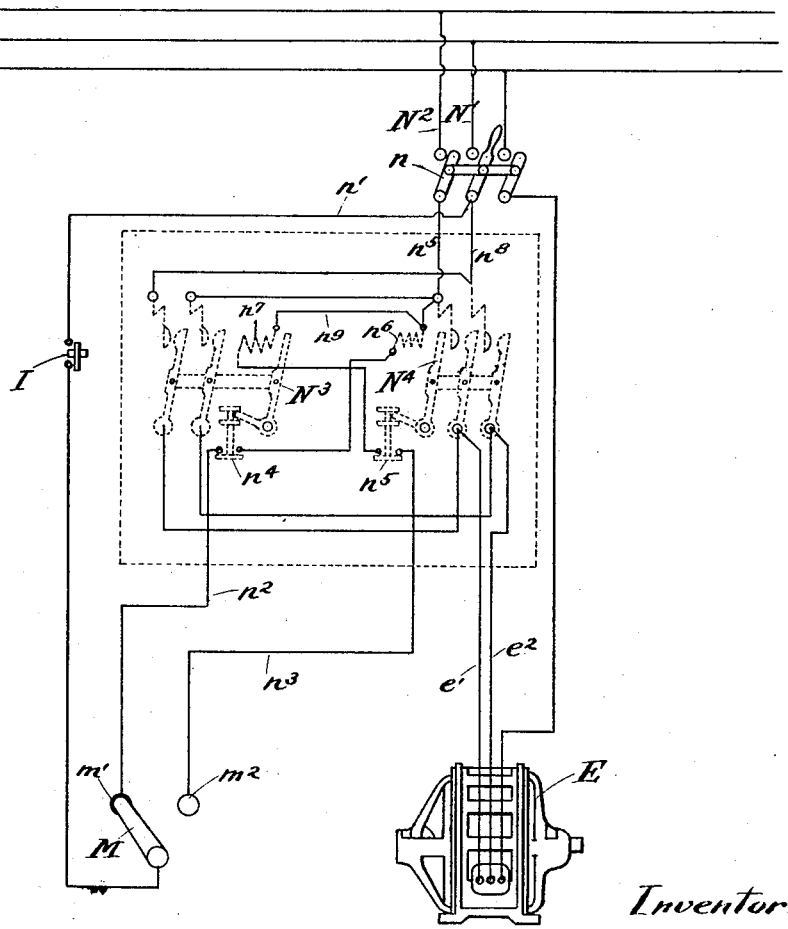
Figure 13:
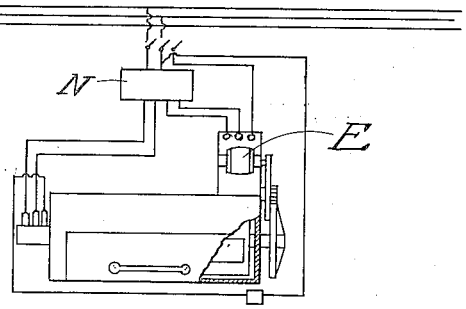
Figure 14:
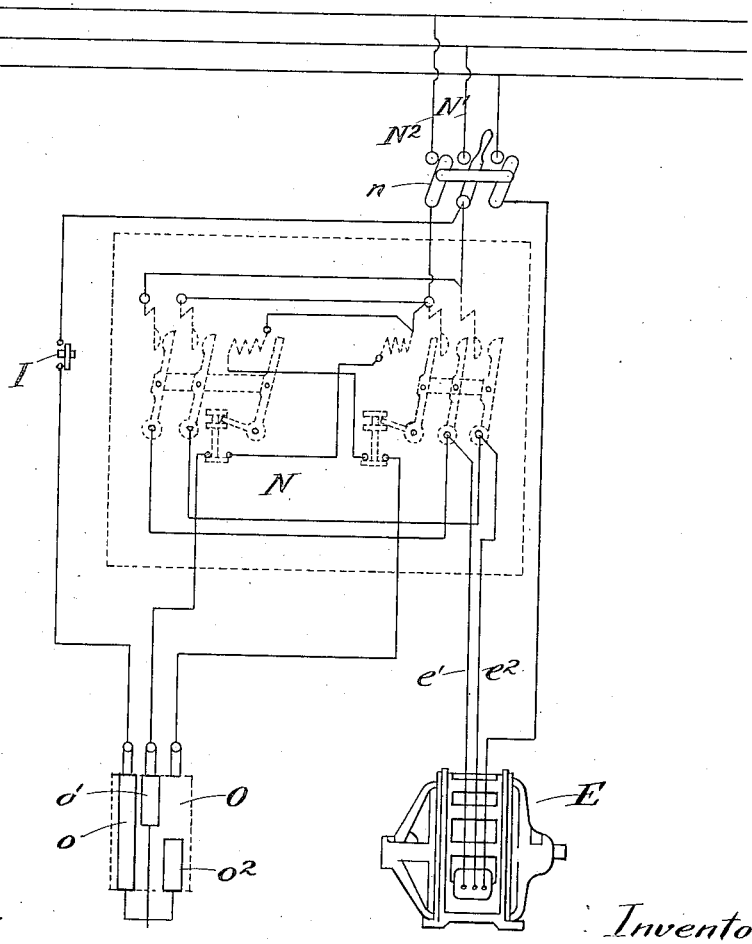
Figure 15:
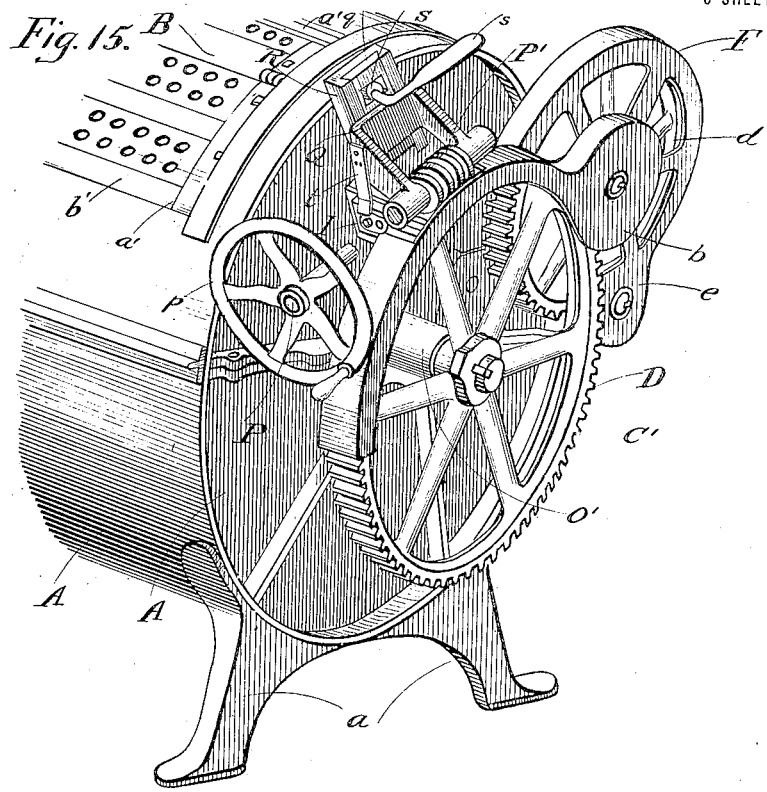
Figure 16:
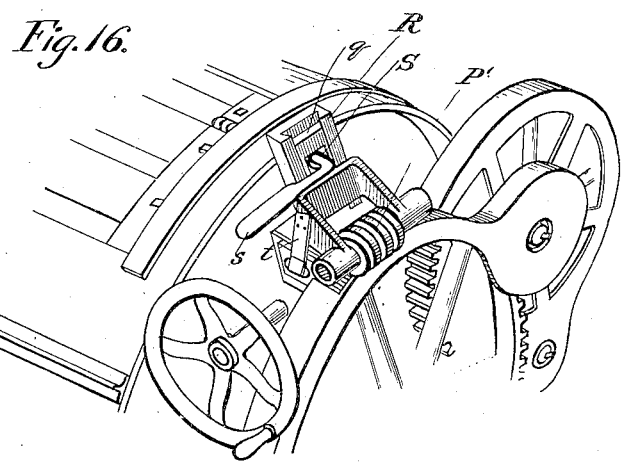

Figure 1 is an end elevational view; Fig. 2 an enlarged end elevation of the mechanism actuated by the rotation of the cylinder; Fig. 3 a side elevational view looking from the left in Fig. 2; Fig. 4 an elevational view of the cam detached from its coöperating parts; Fig. 5 a diagrammatic view illustrating the electrical circuits, the washing machine being shown in plan; Fig. 6 a diagrammatic view illustrating the reversing switch and controlling circuits. Fig. 7 a view similar to Fig. 2 illustrating another form of the mechanism actuated by the rotation of the cylinder; Fig. 8 a side elevational view looking from the left in Fig. 7; Fig. 9 a plan view looking downwardly on Fig. 7; Fig. 10 a detail section on line 10, Fig. 9; Fig. 11 a detail section on line 10, 10, Fig. 9; Fig. 12 a developed view of the contact plates on the controlling drum; Fig. 13 a general diagrammatic view showing the washing machine in plan and the arrangement of the circuits of the form of my invention illustrated in Figs. 7 to 12; Fig. 14 a diagrammatic view of the reversing switch and its relation to the controlled and controlling circuits in the form of my invention shown in Figs. 7 to 13; Fig. 15 a perspective view of the end of the washing machine opposite to that shown in Fig. 1; and Fig. 16 a view similar to Fig. 15 showing the hand operated driving mechanism in operative position.

Similar reference characters are used to designate similar parts in the several figures of the drawings.

Referring more particularly to Figs. 1 to 6, reference character A designates the usual stationary tank of a cylinder washing machine which is mounted upon suitable supports $a$ beneath its opposite ends. The tank A is provided with a door opening $a'$ extending longitudinally of the cylindrical wall thereof, through which access may be had to the rotary cylinder B journaled within the tank A. The cylinder B is also provided with a longitudinal door $b'$ in its cylindrical wall, through which the articles may be inserted into and removed from the cylinder. Trunnions $C'$ and $C^2$ project in opposite directions concentrically from the heads of the cylinder B and extend through bearings concentrically supported by the heads $A'$ and $A^2$ of the tank A. The trunnion $C'$ has fixed thereto a large gear wheel D which meshes with a smaller gear wheel $b$ fixed to a larger gear wheel $d$, which in turn is in mesh with the pinion $e$ driven by an electric motor E. A suitable guard F surrounds the upper portion of the gear wheel D, and incloses the gear wheel $d$ and pinion $e$. The motor is suitably mounted upon the tank A as by means of a bracket $f$, preferably located adjacent the end of the tank on which the meshed gear wheels are mounted.

The trunnion $C^2$, which supports the end of the cylinder B and extends through a bearing in the head $A^2$ of the tank A, has fixed thereto a ring $G^2$ on the outer periphery of which are carried a plurality of radial projections $g^2$. A lever $G'$ is pivotally supported at its upper end upon a post G supported by and projecting outwardly from the head $A^2$ of the tank. The lower end of the lever $G'$ carries an anti-friction roller $g'$ which normally lies in the path of rotation of the projections $g^2$. The lever $G'$ is normally retained in a substantially vertical position by means of a pair of springs $g$, which are connected at their inner ends to the lever $G'$ and at their outer ends to hooks $h$ supported upon a plate H fixed upon the head $A^2$ of the tank above the trunnion $C^2$. The plate H may be conveniently supported upon the head $A^2$ by means of the post G, and by means of a second post $H'$ also extending outwardly from and supported by the head $A^2$.

Loosely mounted upon the portion of the post G intermediate of the plate H and the lever $G'$ is a ratchet wheel J, the teeth of which are engaged by a spring actuated pawl $j$ carried by the lever $G'$. A pawl $j'$ is mounted upon the plate H in position to engage the teeth on the ratchet wheel J to prevent backward rotation thereof. Mounted upon the post G adjacent the ratchet wheel J is a cam K which is provided with a hole $k$ to receive a pin carried by the ratchet wheel J so that the cam is rotated with the ratchet wheel. The cam K is provided with two substantially semi-circular surfaces $K'$, $K^2$, the former having a greater radius than the latter. A shoulder $k'$ is formed on the cam K intermediate of two adjacent ends of the surfaces $K'$, $K^2$, while an inclined surface $k^2$ connects the opposite adjacent ends of the said curved surfaces on the cam.

Fulcrumed upon the plate H adjacent the top thereof is a bell crank lever L, carrying an anti-friction roller $l$ on one end thereof, which extends into the path of the cam K. The upwardly projecting arm of the bell crank lever L is connected by a link $L'$ with a make and break switch M comprising a bell crank lever $m$, which carries two oppositely projecting contact plates $M'$, $M^2$ adapted to alternately engage stationary flexible contacts $m'$, $m^2$. A spring $m^3$ is connected to the opposite arm of the bell crank lever $m$ from that to which the link $L'$ is connected, such spring serving to oscillate the bell crank lever $m$ to close the circuit through contacts $M'$ and $m'$ where the cam surface $K^2$ passes beneath the friction roller $l$ on the bell crank lever L. The controller M comprises the bell crank lever $m$, the contact plates $M'$ and $M^2$, and the flexible fixed contacts $m'$ and $m^2$ and is supported in any suitable manner upon the tank A adjacent the head $A^2$ thereof, as by means of a bracket $M^3$.

The switch M regulates the circuits through a reversing switch N, which in turn so regulates the circuit of the motor E that when the switch M is in one position the motor will be driven in one direction, and when in its other position, the motor will be driven in an opposite direction, thereby reversing the direction of rotation of the cylinder B within the tank A. The arrangement of the various circuits and the relation therewith of the switch M, reversing switch N, and motor E, will be understood from an inspection of Fig. 6 and may be briefly described as follows: When the controller M is in position for the plate $M'$ to engage the flexible fixed contact $m'$, a circuit will be closed comprising, lead $N'$, line switch $n$, lead $n'$, push-button controller I, lead extending therefrom to the controller M, lead $n^2$, interlocking device $n^4$, solenoid $n^6$, lead $n^5$, line switch $n$, and lead $N^2$. The energization of the solenoid $n^6$ attracts its armature $N^4$ which closes the following circuit through the motor E: lead $N'$, line switch $n$, lead $n^8$, reversing switch, lead $e^2$, motor E, lead $e'$, reversing switch, lead $n^5$, line switch $n$, and lead $N^2$. When the switch M has been operated so that the plate $M^2$ thereof breaks the circuit through spring contact $m'$ and closes the circuit through the contact $m^2$, the reversing switch N is so actuated as to reverse the current through the motor E. In such position of the switch N a circuit is closed through the motor comprising the line switch, the lead $n'$, push-button I, contact $m^2$, lead $n^3$, interlocking device $n^5$, solenoid $n^7$, the lead $n^9$, lead $n^5$, line switch $n$, and lead $N^2$. The operation of the solenoid $n^7$ attracts its armature $N^3$ so as to close a circuit comprising lead $N^2$, lead $e^2$, motor E, lead $e'$, lead $n^8$, line switch $n$, and to lead $N'$.

From the above description it will be observed that when the switch M is in one position, a circuit is formed which rotates the motor E in one direction, while when the switch M is in its other position a circuit is formed which rotates the motor E in an opposite direction.

The mechanism which operates the switch M may be briefly described as follows: The rotation of the cylinder causes the projections $g^2$ to successively engage the lower end of the lever $G'$ and to oscillate the same in a direction corresponding to the direction of rotation of the trunnion $C^2$ of the cylinder. When the cylinder is rotated in the direction indicated by the arrow in Fig. 2, the lever G is successively oscillated toward the right, thereby rotating the ratchet wheel J step by step through the engagement of the pawl $j$ therewith. When the inclined surface $k^2$ passes beneath the anti-friction roller $l$ on the bell crank lever L the latter is oscillated by reason of the cam surface $K'$ of greater diameter passing beneath the roller $l$. This oscillation of the lever L operates the switch M through the medium of the link $L'$ so that the plate $M^2$ closes the circuit through the contact $m^2$ and breaks the circuit which had been previously closed by the plate M' through the contact m'. When the cylinder C has made a sufficient number of rotations to rotate the cam K a distance corresponding to the surface K' thereon, the roller l passes on to the shoulder k' permitting the oscillation of the bell crank lever L by the tension of the spring $m^3$. During the instant that the roller l rests upon the shoulder k' the switch M is in a neutral position, such neutral position being, however, only momentary as the momentum of the cylinder causes it to continue to rotate and thereby rotate the cam K the distance of one tooth of the ratchet wheel J so that the surface $K^2$ passes under the roller l, thereby permitting the spring $m^3$ to oscillate the switch M to the position in which circuit is made through the pair of contacts m'. The direction of rotation of the motor is at once reversed, which in turn reverses the direction of rotation of the cylinder C. The projections $g^2$ then move relatively to the lower end of the lever G' in a direction opposite to that indicated by the arrow in Fig. 2. The oscillation of the lever G' by each of the projections $g^2$ moves the pawl j toward the left into engagement with the succeeding tooth on the ratchet wheel J. Immediately upon each projection $g^2$ passing out of engagement with the lower end of the lever G', such lever is returned to its central position through the tension of the springs g, thereby rotating the ratchet wheel J, and with it the cam K, a distance corresponding to one tooth of the ratchet wheel.

The inclined surface $k^2$ and the shoulder k', which connect the adjacent ends of the cam surfaces K' and $K^2$, are important in that the anti-friction roller l rests upon the inclined surface $k^2$ during the oscillation of the ratchet wheel a distance of one tooth, and during that interval retains the switch M in a neutral position, while the step k' accomplishes a similar object when the roller l passes from the cam surface K' to the cam surface $K^2$, namely, it supports the roller l during the interval of the movement of the ratchet wheel a distance of one tooth, and hence retains the switch M in a neutral position during such interval. The cam surfaces, together with the inclined connecting surface $k^2$ and the step k', serve to so actuate the switch M that the motor is driven in one direction, is then disconnected from the current, then driven in reverse direction, and then disconnected from the current.

Should the operation of the machine be discontinued at a time when the switch M is in a neutral position, it may be moved so as to close a circuit through the contact m', or through the contact $m^2$ by reciprocating the rod $G^3$ mounted upon the head $A^2$, such rod being provided with pins $g^3$ and $g^4$, which engage the lever G' and oscillate the same the distance of one tooth of the ratchet wheel J to step the cam around the slight distance necessary to permit the switch M to be moved into one of its circuit closing positions.

In Figs. 7 to 14 I have illustrated a modified embodiment of my invention in which the circuits through the reversing switch N are controlled by a commutator directly connected to the ratchet wheel J, thereby eliminating the controller M and the cam actuated mechanism for operating the same. In this embodiment of my invention the ratchet wheel J and mechanism for rotating the same step by step in a constant direction by the rotation of the cylinder are the same as above described in connection with the form of my invention illustrated in Figs. 1 to 6. A supporting plate $H^2$ is fixed to the head $A^2$ of the tank and upon this plate are supported the pair of springs g for normally returning the lever G' to its central position. The plate $H^2$ supports a post $h^2$ upon which the upper end of the lever G is pivoted, and upon which is loosely mounted the ratchet wheel J and a commutator O fixed to the ratchet wheel. The commutator O comprises a continuous circular conductor strip o which is separately electrically connected with short conductor strips o', $o^2$. The conductor strips on the commutator drum are engaged by brushes, as shown in Fig. 9, which are supported upon a projection $H^3$ extending outwardly from and supported by the plate $H^2$. Leads are connected with the commutator brushes and form parts of the circuits which actuate the reversing switch N, diagrammatically shown in Fig. 14. An inspection of said figure of the drawings will show that when the brush engages the commutator strip o' a circuit will be closed comprising lead N', line switch n, reversing switch N, lead $e^2$, motor E, lead e', reversing switch, line switch, and lead $N^2$. When the brush engages the commutator strip $o^2$ the following motor circuit is then closed: lead N', line switch n, reversing switch, lead e', motor, lead $e^2$, reversing switch, line switch, and lead $N^2$. From the foregoing description it will be observed that in the form of my invention illustrated in Figs. 5 to 14, inclusive, the commutator drum O is constantly rotated in one direction by the rotation of the cylinder through the connecting mechanism, and that the rotation of the commutator drum operates the reversing switch so as to reverse the current leading to the motor E at predetermined intervals.

In order that access may be had to the interior of the cylinder, it is necessary that the door b' thereof should register with the door opening a' of the inclosing tank A. In order that the door of the cylinder may be brought into register with the door opening of the tank after the current has been interrupted to the driving motor, hand operated driving means are provided, through the medium of which the cylinder may be rotated a sufficient distance to bring the door thereof into registry with the door opening of the tank. Such hand operated mechanism comprises a worm P' on a shaft P, which is adapted to mesh with the gear wheel D. The shaft P is rotatably supported by a bracket Q, which is supported in a bearing plate R for movement radially with respect to the gear wheel D. The bracket Q is provided with a dovetail portion q, which engages within a dovetail groove in the supporting plate R. In order to radially adjust the bracket Q, a cam S is located within an opening in the portion q of the bracket, such cam being actuated by a lever s.

The button I which controls the circuit to the motor is located adjacent the movable bracket Q so that when the bracket is in position for the worm P' to mesh with the gear wheel D a guard t carried by the bracket Q overlies the push-button and prevents the actuation thereof to start the motor. The starting of the motor when the hand operated mechanism is in engagement with the gear wheel D is thereby prevented, and consequent injury to the motor, or to gear wheel and hand operated mechanism, avoided. The guard t is preferably provided with an inclined lower end which automatically forces the button I inwardly and thereby interrupts the motor circuit should the hand operated mechanism be lowered without first interrupting the motor circuit.

When it is desired to discontinue the rotation of the cylinder, the push-button I is forced inwardly so as to interrupt the motor circuit. The door opening a' of the tank is then uncovered so that the position of the door on the cylinder may be observed. The cam S is then rotated so as to lower the bracket Q and permit the worm P' to mesh with the gear wheel D. The shaft P is then rotated by means of the hand wheel p, thereby rotating the gear wheel D and with it the cylinder until the latter has assumed a position in which its door registers with the door opening of the tank. The laundried articles may then be removed from the cylinder and other articles placed therein, after which the doors of the cylinder and tank are closed and the cam S oscillated so as to lift the bracket Q and disengage the worm P' from the gear wheel D. The push-button I is then exposed by reason of the lifting of the guard t and may be actuated to close the motor circuit and thereby put the machine into operation.

From the foregoing description it will be evident that I have invented an improved reversing mechanism for electric motor-driven cylinder washing machines, whereby the rotation of the cylinder automatically controls mechanism for periodically reversing the current through the motor so as to reverse the direction of rotation of the cylinder. It is further evident that my invention eliminates any danger of injury to the motor or to the hand operated mechanism for rotating the cylinder by reason of the guard, which prevents the motor circuit being closed when the hand operated mechanism is in mesh with the gear wheel which drives the cylinder.

While I have illustrated and described my invention as applied to a cylinder washing machine, yet it will be understood that it may be practically applied to other machines comprising rotary members which it is desired to periodically reverse.

I claim:

1. In a machine comprising a movable member, means for driving said member, a movable projection actuated by said member, a reciprocating element extending into the path of said projection and reciprocated thereby, a pawl on said element, a ratchet wheel rotated by the successive engagements therewith of said pawl, a cam movable with said ratchet wheel, and mechanism actuated by said cam for effecting the reversal of the direction of movement of said movable member.

2. The combination with a cylinder washing machine, of an electric motor for rotating the cylinder, a circuit for said motor, a reversing switch controlling the motor circuit, a circuit for said switch, and means actuated by the rotation of the cylinder for periodically controlling the circuit of the reversing switch.

3. In a machine comprising a movable member, means for driving said member, a movable projection actuated by the movement of said member, an oscillatory lever extending into the path of said projection and oscillated thereby, means engaging said lever to normally maintain the same in the path of said projection and to return said lever to said normal position after each oscillation thereof by said projection, and mechanism actuated by the oscillation of said lever to periodically reverse the direction of movement of said movable member.

4. In a machine comprising a rotary member, an electric motor for rotating said member, a movable projection actuated by the rotation of said member, and mechanism comprising an oscillatory lever actuated by said projection to periodically reverse the current through said motor.

5. In a machine comprising a rotary member, an electric motor for rotating said member, a movable projection actuated by the rotation of said member, an oscillatory lever extending into the path of said projection and oscillated thereby, and mechanism actuated by the oscillations of said lever to periodically reverse the current through said motor.

6. In a machine comprising a rotary member, an electric motor for rotating said member, a movable projection actuated by the rotation of said member, an oscillatory lever extending into the path of said projection and oscillated thereby, a pawl on said lever, a ratchet wheel rotated by the successive engagements therewith of said pawl, and mechanism operated by said ratchet wheel to periodically reverse the current through said motor.

7. In a machine comprising a rotary member, an electric motor for rotating said member, a movable projection actuated by the rotation of said member, an oscillatory lever extending into the path of said projection and oscillated thereby, a pawl on said lever, a ratchet wheel rotated by the successive engagements therewith of said pawl, a cam movable with said ratchet wheel, a circuit switch for effecting the reversal of the current through said motor, and operative connections between said cam and switch for operating the switch in predetermined sequence with respect to the rotation of said members.

8. In a machine comprising a rotary member, an electric motor for rotating said member, a movable projection actuated by the rotation of said member, an oscillatory lever extending into the path of said projection and oscillated thereby, springs engaging said lever to normally maintain the same in the path of said projection and to return said lever to said normal position after each oscillation thereof by the engagement therewith of said projection, and mechanism actuated by the oscillations of said lever to periodically reverse the current through said motor.

9. In a machine comprising a rotary member, an electric motor for rotating said member, a series of spaced projections rotated by said member, a lever extending into the path of said projections and successively oscillated by their engagement, springs engaging said lever to return the same into the path of said projections after each oscillation thereof, and mechanism actuated by the oscillation of said lever to periodically reverse the current through said motor.

10. In a machine comprising a rotary member, an electric motor for rotating said member, a series of projections rotated by said member, a lever extending into the path of said projections and oscillated through engagement therewith, a pawl on said lever, a ratchet wheel rotated by the successive engagements therewith of said pawl, a cam movable with said ratchet wheel and having two curved surfaces of different radius connected by short intermediate surfaces, a lever engaging said cam and oscillated thereby, a switch for effecting the reversal of current through said motor, and a link connecting said switch with said last mentioned lever.

11. In a machine comprising a movable member, means for driving said member, a series of projections rotated by said member, a lever extending into the path of said projections and oscillated through engagement therewith, a pawl on said lever, a ratchet wheel rotated by the successive engagements therewith of said pawl, a cam movable with said ratchet wheel, a lever engaging said cam and oscillated thereby, and means actuated by said last-mentioned lever to effect the reversal of the movement of said movable member.

12. The combination with a machine comprising a stationary casing, a rotary member within said casing, an electric motor, driving mechanism connecting said motor with said member, a circuit for said motor, a switch for said circuit, an element mounted upon said casing and movable relatively to the driving mechanism, and a guard movable with said element for preventing the operation of said switch to start the motor when said element is in one position, and for permitting the operation of said switch to start the motor when said element is in another position.

13. In a cylinder washing machine, the combination with a stationary tank, of a rotary cylinder within said tank, an electric motor operatively connected to said cylinder to drive the same, hand operated mechanism movable into and out of driving relation with said cylinder, a circuit for said motor, a switch for said circuit, and means actuated by said hand operated mechanism when in driving relation with the cylinder to prevent operation of said switch.

14. In a cylinder washing machine comprising a stationary tank and rotary cylinder therein, the combination of an electric motor, of meshed gears, one fixed to said cylinder and one driven by said motor, a circuit for said motor, a switch for controlling said circuit to start and stop the rotation of the cylinder, a hand operated gear movable into and out of mesh with the gear on the cylinder, and a guard movable with said hand operated mechanism to prevent the operation of said switch to start the motor when said hand operated gear is in mesh with the gear on the cylinder.

15. The combination with a machine, of driving means connected with said machine for operating the same, means controlling the operation of the machine by said driving means, hand-operated mechanism movable into and out of driving relation with said machine, and means actuated by said hand-operated mechanism when in driving relation with said machine to prevent the operation of said controlling means to connect the driving means with the machine.

16. The combination with a machine, of power-transmitting mechanism connecting a source of power with said machine, means controlling the application of power to said power-transmitting mechanism, an auxiliary driving means movable into and out of engagement with said power-transmitting mechanism, and means actuated by said auxiliary driving means when in engagement with said power-transmitting mechanism for preventing the operation of said power-controlling means.

In testimony whereof, I have subscribed my name.

FRITZ BALZER.

Witnesses:
  GEO. L. WILKINSON,
  HENRY A. PARKS.